(12) United States Patent
Niino et al.

(10) Patent No.: US 7,445,298 B2
(45) Date of Patent: Nov. 4, 2008

(54) BRAKE CONTROL APPARATUS FOR VEHICLE

(75) Inventors: Hiroaki Niino, Toyota (JP); Takashi Sato, Okazaki (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 101 days.

(21) Appl. No.: 11/698,917

(22) Filed: Jan. 29, 2007

(65) Prior Publication Data

US 2007/0188017 A1    Aug. 16, 2007

(30) Foreign Application Priority Data

Feb. 15, 2006   (JP)   .............................. 2006-037998

(51) Int. Cl.
*B60T 13/18* (2006.01)

(52) U.S. Cl. .................... 303/11; 303/113.2; 303/113.4

(58) Field of Classification Search ................... 303/10, 303/11, 113.1–113.5, 116.1–116.2, 119.1
See application file for complete search history.

(56) References Cited

U.S. PATENT DOCUMENTS

| 6,113,197 | A | 9/2000 | Kuroki et al. | |
| 6,234,588 | B1 | 5/2001 | Sawada | |
| 2007/0188014 | A1* | 8/2007 | Sato et al. | 303/11 |
| 2007/0188015 | A1* | 8/2007 | Sato et al. | 303/11 |
| 2007/0205658 | A1* | 9/2007 | Sato et al. | 303/10 |
| 2007/0210642 | A1* | 9/2007 | Niino et al. | 303/11 |
| 2007/0210648 | A1* | 9/2007 | Sato et al. | 303/155 |
| 2008/0048492 | A1* | 2/2008 | Sakai | 303/113.1 |

FOREIGN PATENT DOCUMENTS

| JP | 10-203338 A | 8/1998 |
| JP | 11-301435 A | 11/1999 |

* cited by examiner

*Primary Examiner*—Christopher P Schwartz
(74) *Attorney, Agent, or Firm*—Buchanan Ingersoll & Rooney PC (57) ABSTRACT

A brake control apparatus for a vehicle includes: controlling means having timing means for timing an elapsed time from a brake operation starting time, and extended period of time calculating means obtaining an extended period of time based upon a target wheel cylinder pressure corresponding to an operation amount detected by an operation amount detecting sensor when the timing means times a predetermined period of time at which an amount of brake fluid discharged by each pump reaches a threshold value of brake fluid amount to generate an actual wheel cylinder pressure. During the extended period of time, the value of electric current to be supplied to each first and second motor is maintained at the maximum value.

7 Claims, 9 Drawing Sheets

BRAKE CONTROL APPARATUS FOR VEHICLE

CROSS REFERENCE TO RELATED APPLICATIONS

This application is based on and claims priority under 35 U.S.C. § 119 to Japanese Patent Application 2006-037998, filed on Feb. 15, 2006, the entire content of which is incorporated herein by reference.

FIELD OF THE INVENTION

The present invention relates to a brake control apparatus for a vehicle in which a pump is employed to generate pressure (hereinafter referred to as W/C pressure) at a wheel cylinder (hereinafter referred to as W/C).

BACKGROUND

Heretofore, JP10-203338A, which corresponds to U.S. Pat. No. 006,113,197A, proposes a vehicle brake control apparatus of a brake-by-wire type, which has four pumps respectively for four wheels of a vehicle. Two of the four pumps are located in a first conduit system and are driven by a common motor, and the other two are located in a second conduit system and are driven by the other common motor.

In the above-described brake-by-wire type vehicle brake control apparatus, W/C pressure of each vehicle wheel is generated on the basis of a discharge amount of brake fluid of each pump driven by the corresponding motor. In such structure, the W/C pressure of each vehicle wheel would not rise (increase) until the amount of brake fluid discharged by the pump reaches a certain level. The brake fluid amount, which is insufficient to increase the W/C pressure, is herein referred to an ineffective fluid amount. Such ineffective fluid amount may impair the braking response at an initial brake operation.

In order to improve such braking response at the initial stage, it is preferable to always drive the motor to the full extent, i.e., at a rotation speed appropriate to discharge the brake fluid.

Meanwhile, since such brake-by-wire type brake control apparatus requires two motors driven with a larger electric power supplied from a battery, it is desirable to reduce the power consumption as much as possible. Therefore, it is not preferable to consider only the braking response at the initial stage and to always drive the motors to the full extent.

In the light of the foregoing, it is necessary to reduce motor power consumption while improving the braking response at the initial brake operation.

As one possible method of coping with the above, a motor can be driven to the full extent until a discharge amount of brake fluid from the pump reaches a certain level exceeding an ineffective fluid amount. After the discharge amount reaches the certain level, the amount of the electric power supplied to the motor can be reduced in response to a target braking force.

However, when the discharge amount of brake fluid from the pump reaches the certain level exceeding the ineffective fluid amount, pressure differential between a target W/C pressure and an actual W/C pressure has already been created. Accordingly, the braking response at the initial brake operation may not be properly improved.

The present invention has been made in view of the above description and provides a brake-by-wire type brake control apparatus for a vehicle, in which braking response at an initial brake operation is improved and the power consumption by a motor is reduced.

SUMMARY OF THE INVENTION

According to an aspect of the present invention, the present invention is characterized in that a controlling means includes: timing means for timing an elapsed time from the brake operation starting time; and extended period of time calculating means obtaining an extended period of time based upon a target wheel cylinder pressure corresponding to an operation amount detected by an operation amount detecting sensor when the timing means times a predetermined period of time at which an amount of brake fluid discharged by each first, second, third and fourth pump reaches a threshold value of brake fluid amount to generate an actual wheel cylinder pressure. During the extended period of time, the value of electric current to be supplied to each first and second motor is maintained at the maximum value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained below with reference to the drawings. In the embodiments below, identical reference symbols are used in the drawings to represent identical or equivalent elements.

FIRST EMBODIMENT

Figure 1:
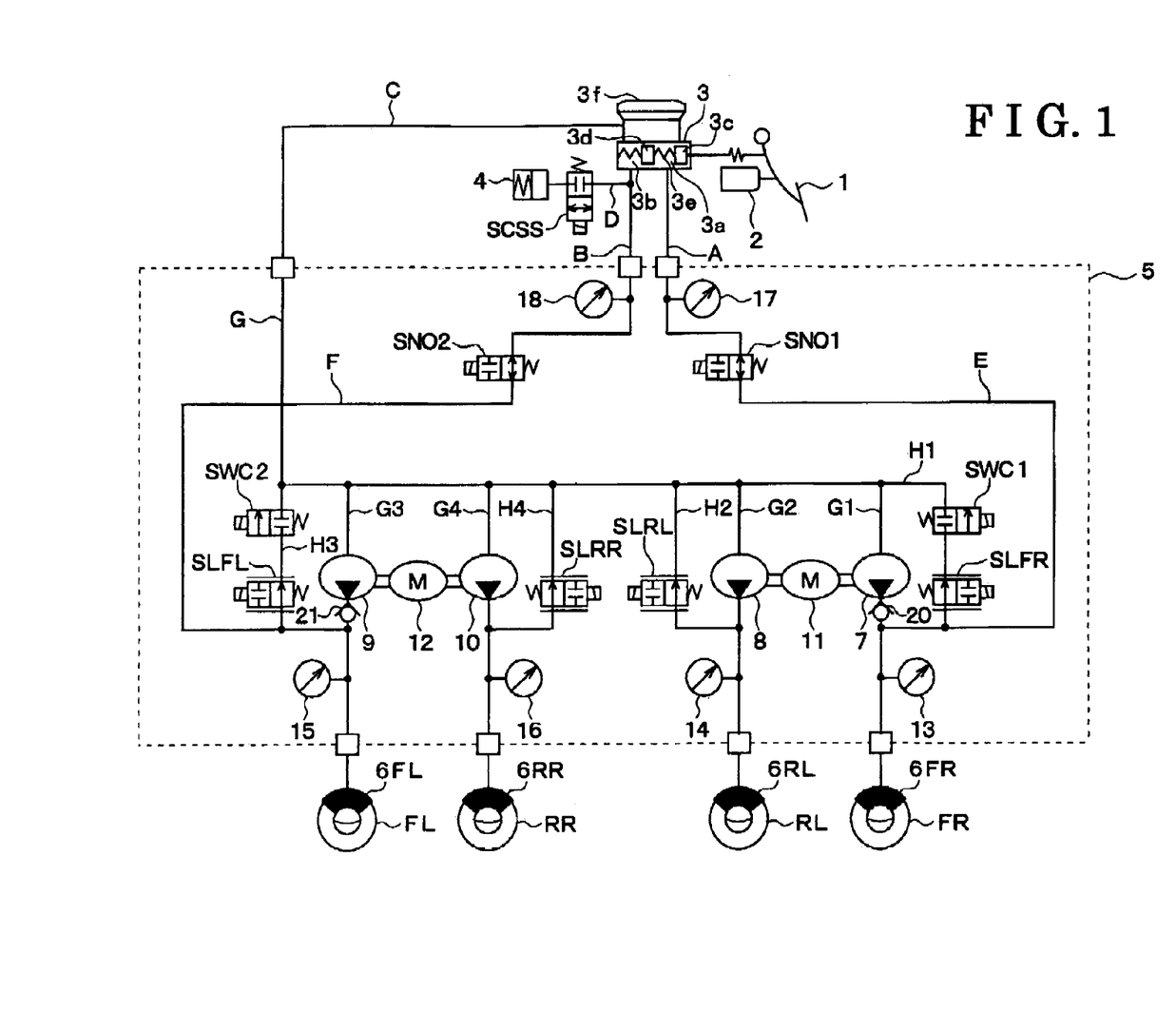
FIG. 1 is a view illustrating a configuration of a fluid pressure circuit of a brake control apparatus for a vehicle according to a first embodiment of the present invention.
Figure 2:
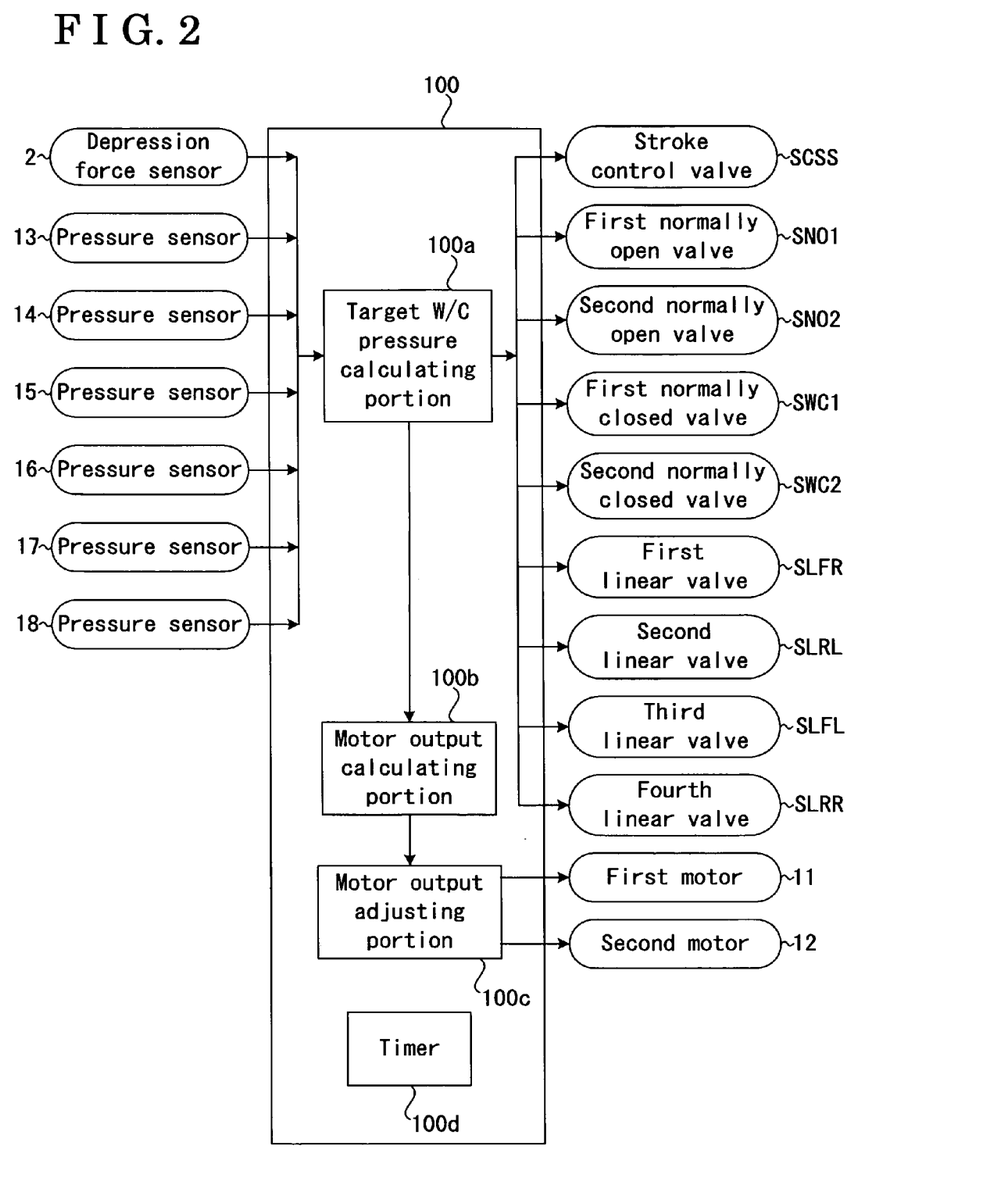
FIG. 2 is a block view illustrating a relationship of input and output of a signal of a brake ECU serving as a control system of the brake control apparatus illustrated in FIG. 1.

FIG. 1 illustrates a configuration of a fluid pressure circuit of a brake control apparatus for a vehicle according to a first embodiment of the present invention. FIG. 2 illustrates input and output relationships of signals of a brake system ECU 100 serving as a control system of the brake control apparatus for the vehicle illustrated in FIG. 1. Explained hereinafter is a structure of the brake control apparatus for a vehicle with reference to the drawings. Here, the brake control apparatus for the vehicle is applied to a vehicle having a fluid pressure circuit with a cross (X) dual conduit system (diagonal conduit system), one conduit system for front-right and rear-left wheels and the other conduit system for front-left and rear-light wheels.

As illustrated in FIG. 1, the brake control apparatus for the vehicle includes, in addition to the brake system ECU 100 (FIG. 2), a brake pedal 1, a depression force sensor 2 for the brake pedal 1, a brake master cylinder (hereinafter referred to as M/C) 3, a stroke control valve SCSS, a stroke simulator 4, a brake fluid pressure control actuator 5 and four wheel cylinders for each vehicle wheel (hereinafter referred to as W/C) 6FL, 6FR, 6RL and 6RR.

Once the brake pedal 1, which is an example of a brake operating member, is depressed by a driver or user, the depression force applied to the brake pedal 1 is inputted into the depression force sensor 2. The depression force sensor 2 outputs a detection signal corresponding to the level of depression force applied to the brake pedal 1. This detection signal is inputted into the brake system ECU 100 and the brake system ECU 100 stores the depression force applied to the brake pedal 1. According to the first embodiment, the depression force sensor 2 is employed as an example of an operation amount sensor for detecting an operation amount of the brake operating member. However, a stroke sensor or the like can be employed as long as the operation amount of the brake pedal 1 can be detected. Further, as an alternative method for detecting the operation amount of the brake operating member, a state of operation of the brake pedal 1 can be detected on the basis of a detection signal of a stroke sensor or detection signals of pressure sensors 17 and 18 for detecting the pressure at the MC (which will be described later in detail).

The brake pedal 1 is connected to a push rod, or the like for transmitting the depression force applied to the brake pedal 1 to the M/C 3. In response to a movement of the push rod, M/C pressure is generated in a primary chamber 3a and a secondary chamber 3b, both of which are defined in the M/C 3.

In the M/C 3, a primary piston 3c and a secondary piston 3d are disposed to define the primary chamber 3a and the secondary chamber 3b. The primary piston 3c and the secondary piston 3d normally receive an elastic force of a spring 3e to keep or return the brake pedal 1 to its initial non-braking position when the brake pedal 1 is not depressed, i.e., when the brake pedal 1 is free from depression force.

The primary chamber 3a of the M/C 3 is connected to a conduit A, while the secondary chamber 3b thereof is connected to a conduit B. The conduits A and B extend to a brake fluid pressure control actuator 5, respectively.

The M/C 3 is provided with a master reservoir (reservoir) 3f. When the brake pedal 1 is in the initial position, the master reservoir 3f communicates with the primary chamber 3a and the secondary chamber 3b via passages (not-illustrated), wherein the master reservoir 3f supplies brake fluid into the M/C 3 or stores surplus brake fluid of the M/C 3.

A conduit C directly extends from the master reservoir 3f to the brake fluid pressure control actuator 5.

The stroke simulator 4 is connected to a conduit D communicating with the conduit B and the stroke simulator 4 reserves therein brake fluid of the secondary chamber 3b, serving as a reservoir for the secondary chamber 3b. The conduit D is provided with the stroke control valve SCSS that is a normally closed type valve and can be controlled in two-positions, namely, an open position and a closed position, so that fluid communication in the conduit D is selectively established or interrupted. Therefore, this stroke control valve SCSS controls the brake fluid flow to the stroke simulator 4.

Described below is a structure of the brake fluid pressure control actuator 5.

A conduit E is connected to the conduit A so that the primary chamber 3a of the M/C 3 communicates with a W/C (first front W/C) 6FR for the front wheel FR (first front wheel). The conduit E is mounted with a first normally open valve SNO1 controlled in two-positions. The first normally open valve SNO1 is controlled in an open position when not electrically energized so that fluid communication in the conduit E is established. On the other hand, the first normally open valve SNO1 is controlled in a closed position when electrically energized so that the fluid communication in the conduit E is interrupted.

A conduit F is connected to the conduit B so that the secondary chamber 3b of the M/C 3 communicates with another W/C (second front W/C) 6FL for the front wheel FL (second front wheel). The conduit F is mounted with a second normally open valve SNO2 controlled in two-positions. The second normally open valve SNO2 is controlled in an open position when not electrically energized so that fluid communication in the conduit F is established. On the other hand, the second normally open valve SNO2 is controlled in a closed position when electrically energized so that the fluid communication in the conduit F is interrupted.

A conduit G is connected to the conduit C extending from the master reservoir 3f. The conduit G branches to four conduits G1 (first conduit), G2 (second conduit), G3 (third conduit) and G4 (fourth conduit). Each conduit G1, G2, G3 or G4 is connected to each W/C (first front wheel W/C) 6FR, W/C (first rear wheel W/C) 6RL, W/C (second front wheel W/C) 6FL or W/C (second rear wheel W/C) 6RR. The W/C 6RL is mounted on a rear wheel RL (first rear wheel) while the W/C 6RR is mounted on a rear wheel RR (second rear wheel).

The conduits G1, G2, G3 and G4 are provided with four pumps (first, second, third and fourth pumps) 7, 8, 9 and 10, respectively. Each pump 7, 8, 9 and 10 is a gear pump which is effective for example for quietness. The pumps 7 and 8 are driven by a first motor 11, while the pumps 9 and 10 are driven by a second motor 12. Although any type of motor can be applicable as the first and second motors 11 and 12, it is preferable to employ a brushless motor which normally has a quick starting time.

The pumps 7, 8, 9 and 10 are provided with conduits H1, H2, H3 and H4 respectively. Each conduit H1, H2, H3 and H4 forms a modulating circuit for each pump and is arranged in parallel with each corresponding pump.

A first normally closed valve SWC1 and a first linear valve SLFR are in series provided in the conduit H1 connected in parallel to the pump 7. The first normally closed valve SWC1 is positioned upstream of the pump 7 (an intake port side of the pump 7) and the linear valve SLFR is positioned downstream of the pump 7 (a discharge port side of the pump 7). Therefore, the first normally closed valve SWC1 controls the brake fluid return flow toward the master reservoir 3f via the conduit H1.

The conduit H2, which is connected in parallel to the pump 8, is mounted with a second linear valve SLRL.

A second normally closed valve SWC2 and a third linear valve SLFL are in series provided in the conduit H3 connected in parallel to the pump 9. The second normally closed valve SWC2 is positioned upstream of the pump 9 (an intake port side of the pump 9) and the third linear valve SLFL is positioned downstream of the pump 9 (a discharge port side of the pump 9). Therefore, the second normally closed valve SWC2 controls the brake fluid return flow toward the master reservoir 3f via the conduit H3.

The conduit H4, which is connected in parallel to the pump 10, is mounted with a fourth linear valve SLRR.

The conduits G1, G2, G3 and G4 are provided with W/C pressure sensors (first, second, third and fourth pressure sensors) 13, 14, 15 and 16 between the pumps 7, 8, 9 and 10 and the W/Cs 6FR, 6RL, 6FL and 6RR, respectively. Each W/C pressure sensor 13-16 detects W/C pressure of each wheel cylinder. Further, the M/C pressure sensors 17 and 18 are respectively located in the brake conduits E and F on the upstream sides (the M/C 3 sides) of the first and second normally open valves SNO1 and SNO2. The M/C pressure sensors 17 and 18 detect M/C pressure generated in the primary chamber 3a and the secondary chamber 3b of the M/C 3, respectively.

The W/C 6FR of the front wheel FR is supplied with a pressurized fluid discharged from the discharge port of the pump 7 to generate the brake pressure at the W/C 6FR. A check valve 20 is mounted at the discharge port of the pump 7. The W/C 6FL of the front wheel FL is supplied with a pressurized fluid discharged from the discharge port of the pump 9 to generate the brake pressure at the W/C 6FR. A check valve 21 is mounted at the discharge port of the pump 9. The check valves 20 and 21 prevent the flow of brake fluid from the W/Cs 6FR and 6FL to the pumps 7 and 9, respectively. As described above, these components form the brake fluid pressure control actuator 5.

In the brake control apparatus for the vehicle as described above, a first conduit system is structured with a fluid pressure circuit (first auxiliary conduit), which connects the primary chamber 3a of the M/C 3 with the W/C 6FR via the conduits A and E, a fluid pressure circuit (main conduit), which connects the master reservoir 3f with the W/Cs 6FR and 6RL via the conduits C, G, G1 and G2, and fluid pressure circuits (first and second pressure modulating circuits) of the conduits H1 and H2 connected in parallel to the pumps 7 and 8.

A second conduit system is structured with a fluid pressure circuit (second auxiliary conduit), which connects the secondary chamber 3b of the M/C 3 with the W/C 6FR via the conduits B and F, a fluid pressure circuit (the main conduit), which connects the master reservoir 3f with the W/Cs 6FL and 6RR via the conduit C, the conduit G, and the conduits G3 and G4, and fluid pressure circuits (third and fourth pressure modulating circuits) of the conduits H3 and H4 connected in parallel to the pumps 9 and 10 respectively.

As illustrated in FIG. 2, the brake system ECU 100 is inputted with detection signals of the depression force sensor 2, the pressure sensors 13-18.

The brake system ECU 100 is configured with a known microcomputer provided with a CPU, a ROM, a RAM, an I/O, a timer 100d and so on and executes various processes in accordance with programs stored in the ROM or the like. The brake system ECU 100 is provided with semiconductor switching elements (not illustrated). These switching elements are on/off controlled to on/off control electric power supply lines to various components, such as the control valves SCSS, SNO1, SNO2, SWC1, SWC2, SLFR, SLRL, SLFL and SLRR, the first and second motor 11 and 12, so that the amount of electric current supplied per unit time (consumption power amount) to these components is controlled.

More specifically, the brake system ECU 100 incorporates therein a target W/C pressure calculating portion 100a, a motor output calculating portion 100b and a motor output adjusting portion 100c, and so on.

The target W/C pressure calculating portion 100a calculates a target W/C pressure required to generate a target braking force. More specifically, the target W/C pressure calculating portion 100a first calculates a physical value of depression force which corresponds to a brake operating amount, based upon a detection signal of the depression force sensor 2. The target W/C pressure calculating portion 100a then calculates a target braking force, which corresponds to the physical value of depression force and calculates the target W/C pressure, which is required to generate the target braking force. The target W/C pressure calculating portion 100a also can calculate a requisite amount of the brake fluid corresponding to the target W/C pressure.

Figure 3:
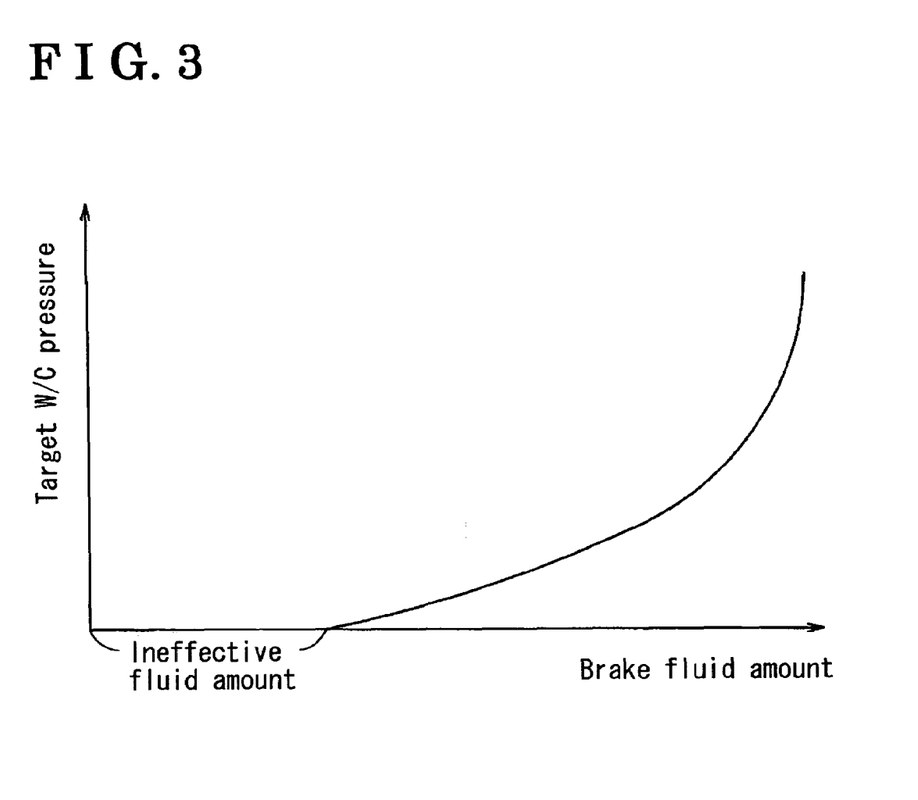
FIG. 3 is a performance graph of an amount of brake fluid and a target W/C pressure.

FIG. 3 shows a performance graph of an amount of brake fluid and a target W/C pressure. For example, as is explained in FIG. 3, the target W/C pressure is not increased at a brake caliper until the brake fluid is supplied to the W/C at an amount corresponding to a threshold value of brake fluid amount. Once the amount of brake fluid supplied to the W/C reaches the amount corresponding to the threshold value of brake fluid amount, the target W/C pressure, i.e., a braking force is generated in response to an increase in an amount of brake fluid supplied. Here, the threshold value of brake fluid amount is the least value exceeding an ineffective fluid amount at which an actual W/C pressure is not increased, i.e., any which a braking force is not generated. Therefore, when the target W/C pressure calculating portion 100a identifies a level of a target W/C pressure, the requisite amount of brake fluid corresponding to the target W/C pressure is obtained based upon this performance graph or a formula representing the relationship between the amount of brake fluid (x-axis) and the target W/C pressure (y-axis). The target W/C pressure is obtained in accordance with a known method so that the explanation thereof will be omitted herein.

The motor output calculating portion 100b calculates a value of electric current to be outputted to the first and second motors 11 and 12. More specifically, the motor output calculating portion 100b computes an extended period of time, during which the first and second motors 11 and 12 are driven to the full extent, based upon the target W/C pressure, or a parameter of the target W/C pressure in situations where each pump 7, 8, 9 and 10 discharges brake fluid at the amount corresponding to the threshold value of brake fluid amount. The parameter for the target W/C pressure can be any one of an operation amount of the brake pedal 1, a target braking force, and a necessary amount of brake fluid. The calculation of the extended period of time is explained in detail with reference to FIG. 4.

Figure 4:
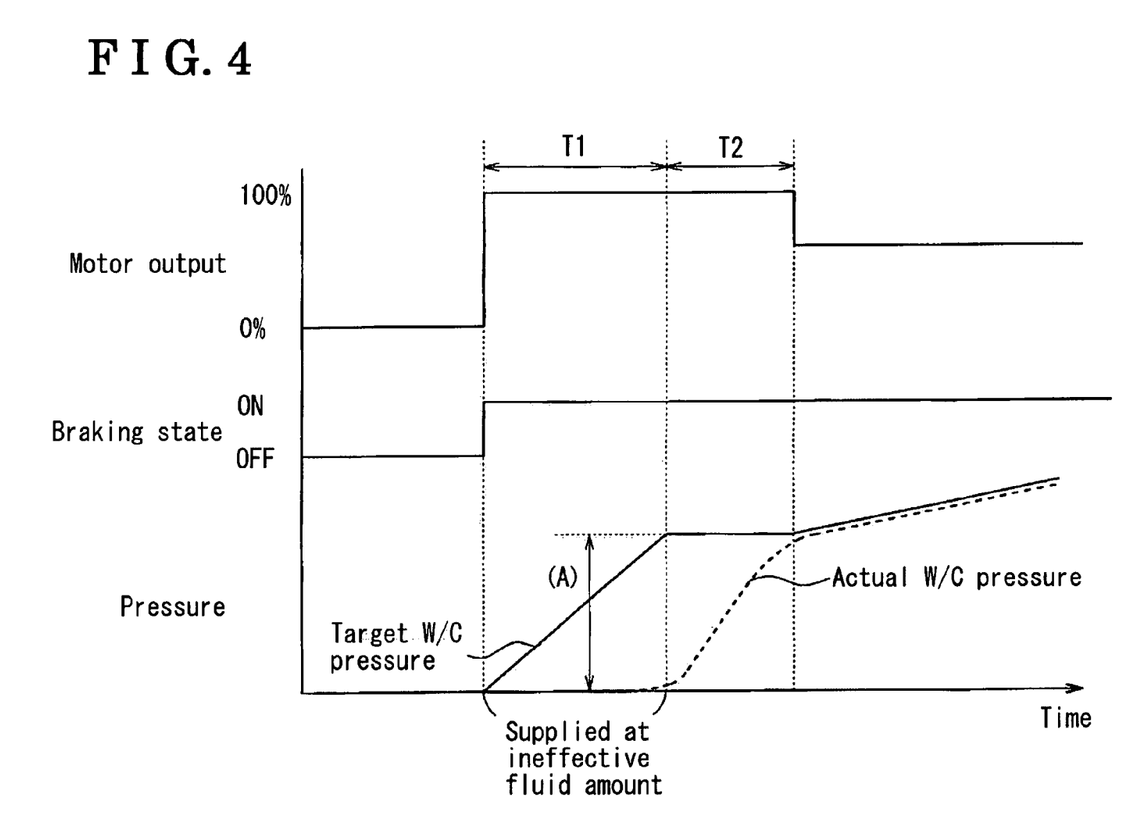
FIG. 4 is a timing diagram explaining a motor output, a braking state, a target W/C pressure and an actual W/C pressure immediately before and after a brake operation starting time.

FIG. 4 is a timing diagram explaining a motor output, a braking state, a target W/C pressure and an actual W/C pressure immediately before/after a brake operation starting time.

When the brake operation is started, i.e., when the braking state is switched from off to on, the motor output calculating portion 100b controls the amount of electric current to be supplied to each motor 11 and 12 to the maximum, e.g., controls the amount of electric current per unit time to the maximum for example by altering a duty ratio of electric current to 100%. Each motor 11 and 12 is then driven to the full extent.

While the first and second motors 11 and 12 are being driven to the full extent until a period of time (first period of time) T1 is elapsed from the brake operation starting point, a discharge amount of brake fluid of each pump 7, 8, 9 and 10 reaches the threshold value of brake fluid amount. At this point, since an actual W/C pressure has not been increased yet, there is a pressure differential between a target W/C pressure and an actual W/C pressure. Therefore, the motor output calculating portion 100b computes an extended period of time (second period of time) T2, during which each motor 11 and 12 is driven to the full extent, on the basis of the pressure differential between a target W/C pressure and an actual W/C pressure where the actual W/C pressure has not been increased. Here, braking force is assumed to be generated once an actual W/C pressure is increased in the period of time T1.

It takes more time for the actual W/C pressure to reach and follow the target W/C pressure with an increase in a pressure differential between a target W/C pressure and the actual W/C pressure in this case. Therefore, it is preferable to reduce such pressure differential as soon as possible. According to a conventional method, the motor output calculating portion 100b stops driving each motor 11 and 12 to the full extent in the period of time T1 from the brake operation starting point and resets a motor output (electric current value) corresponding to a target W/C pressure. This may delay braking response at the initial brake operation, as described above. However, according to the first embodiment of the present invention, the extended period of time T2, during which each motor 11 and 12 is driven to the full extent, is computed on the basis of a pressure differential between a target W/C pressure and an actual W/C pressure. As a result, an actual W/C pressure can reach and follow a target W/C pressure as soon as possible so that braking responsiveness during an initial brake operation is enhanced.

For example, a formula, in which, more the target W/C pressure increases, the more the extended period of time T2 is set to be increased, or a map representing a relationship between a target W/C pressure and an extended period of time T2, is stored in advance and the motor output calculating portion 100b computes an extended period of time T2 by use of them.

As described above, according to the first embodiment of the present invention, the extended period of time T2 is obtained, during which each motor 11 and 12 is driven to the full extent on the basis of a pressure differential between a target W/C pressure and an actual W/C pressure. At a point where the period of time T1 is elapsed, an actual W/C pressure is substantially zero. Therefore, the extended period of time T2 can be obtained on the basis of any of an operation amount of the brake pedal 1, a target braking force and a necessary amount of brake fluid, which all are parameters for representing the target W/C pressure.

The motor output adjusting portion 100c operates to supply electric current to each motor 11 and 12 at a current value computed by the motor output calculating portion 100b, wherein an amount of electric current supplied to each motor 11 and 12 is effectively adjusted. For example, the motor output adjusting portion 100c controls a value of electric current per unit of time supplied to each motor 11 and 12 (power consumption) by duty-controlling turning on or off of the semiconductor switching elements, wherein electric current is supplied to each motor 11 and 12 at a computed value.

The brake system ECU 100 outputs control signals (control current) on the basis of calculation or judgment results by the target W/C pressure calculating portion 100a and the motor output calculating portion 100b and operates each valve SCSS, SNO1, SNO2, SWC1, SWC2, SLFR, SLRL, SLFL and SLRR and each motor 11 and 12 via the motor output adjusting portion 100c, wherein W/C pressure is generated at each W/C 6FR-6RR. The brake system ECU 100 computes W/C pressure and M/C pressure on the basis of a detection signal of each pressure sensor 13 to 18 and feedbacks an actually generated braking force (actual braking force) to be approximated to a target barking force.

The brake system ECU 100 outputs the aforementioned control signals on the basis of electric current supply from an in-vehicle battery that is not illustrated.

The operation of the brake control apparatus during a normal brake operation and in an abnormal situation will be explained below separately.

Table 1 shows the operating states of portions of the brake control apparatus during the normal brake operation and in the abnormal situation. The brake system ECU 100 determines, by executing a conventional initial check or the like, whether the abnormal situation has occurred. Once the abnormal situation arises, an abnormal-state brake operation is executed until the abnormal situation is released.

TABLE 1

|  | Normal Brake Operation | Abnormal Situation |
| --- | --- | --- |
| SNO1 | ON (Disconnecting) | OFF (Connecting) |
| SNO2 | ON (Disconnecting) | OFF (Connecting) |
| SWC1 | ON (Connecting) | OFF (Disconnecting) |
| SWC2 | ON (Connecting) | OFF (Disconnecting) |
| SLFR | DUTY | OFF (Connecting) |
| SLRL | DUTY | OFF (Connecting) |
| SLFL | DUTY | OFF (Connecting) |
| SLRR | DUTY | OFF (Connecting) |
| SCSS | ON (Connecting) | OFF (Disconnecting) |
| 1st, 2nd Motors | Variable Control | OFF |

Figure 5:
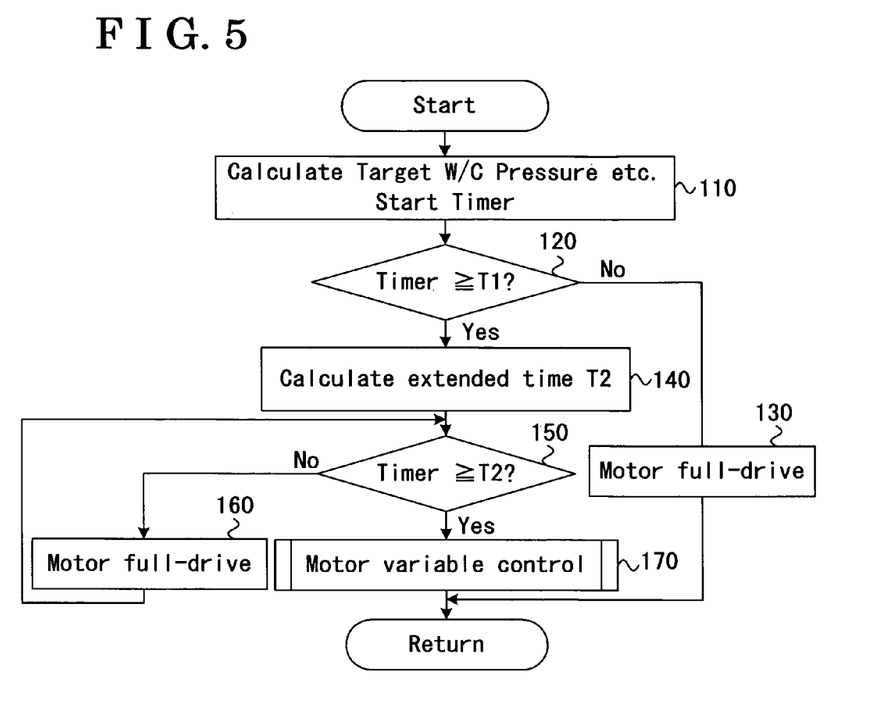
FIG. 5 is a flowchart illustrating a motor driving control process performed by the brake ECU during a normal brake operation.
Figure 6:
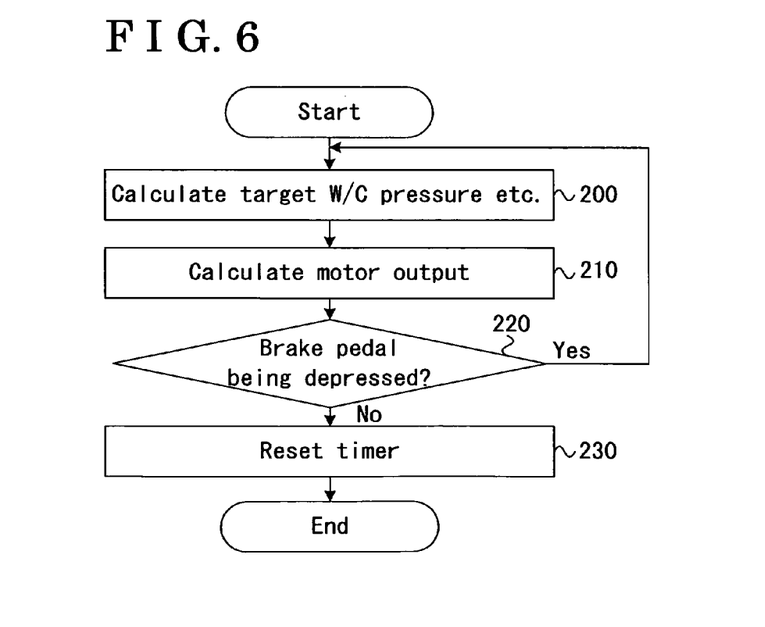
FIG. 6 is a flowchart illustrating a motor variable control process in FIG. 5.

FIGS. 5 and 6 are flowcharts for explaining a motor driving control implemented by the brake system ECU 100 during the normal brake operation. The program in FIGS. 5 and 6 for a motor driving control is performed every operation cycle of the brake system ECU 100 in a situation where the depression force sensor 2 detects depression of the brake pedal 1.

Described below is an operation during a normal brake operation or in an abnormal situation with reference to the flowcharts in FIGS. 5 and 6.

(1) Operation During the Normal Brake Operation

During the normal brake operation, when the brake pedal 1 is depressed and the detection signal of the depression force sensor 2 is inputted to the brake system ECU 100, the brake system ECU 100 computes a target W/C pressure (A) or a necessary amount of brake fluid corresponding to the target W/C pressure (A) (S110 in FIG. 5). The target W/C pressure calculating portion 100a of the brake system ECU 100 implements this computing. Here, the timer 100d in the brake system ECU 100 starts counting an elapsed time from a brake operation starting point.

The program proceeds to step S120 and the brake system ECU 100 judges whether the elapsed time counted by the timer 100d is equal to or greater than the period of time T1, i.e., whether the period of time T1 has elapsed from the brake operation starting point time. When a negative answer "NO" is obtained in step S120, i.e., when the period of time T1 has not been elapsed yet, the amount of brake fluid discharged by each pump driven by each motor 11 and 12 has not reached the threshold value of brake fluid amount. The program hence proceeds to step S130. In this step S130, the motor output calculating portion 100b sets a value of electric current to be supplied to each motor 11 and 12 in a manner that each motor 11 and 12 is driven to the full extent. The program is repeated again from step S110.

Once the elapsed time counted by the timer 100d turns to a value equal to or greater than the period of time T1, an affirmative answer "YES" is obtained in step S120 and the program proceeds to step S140 in this case.

In step S140, the motor output calculating portion 100b of the brake system ECU 100 calculates an extended period of time T2. The extended period of time T2 is calculated on the basis of a target W/C pressure obtained in step S110. As described above, the motor output calculating portion 100b computes the extended period of time T2, for example, by use of a formula, by which the extended period of time T2 is increased with an increase in a target W/C pressure, or a map representing a relationship between the target W/C pressure and the extended period of time T2.

The program then proceeds to step S150 and the brake system ECU 100 judges whether the elapsed time counted by the timer 100d turns to a value equal to or greater than the extended period of time T2, i.e., whether the extended period of time T2 has elapsed. When a negative answer "NO" is obtained in step S150, i.e., when the extended period of time T2 has not elapsed yet, the program proceeds to step S160. In step S160, the motor output calculating portion 100b sets a value of electric current to be supplied to each motor 11 and 12 in a manner that each motor 11 and 12 is driven to the full extent. When an affirmative answer "YES" is obtained in step S150, i.e., when the extended period of time T2 has elapsed, the program then proceeds to step S170, wherein a motor variable control process is performed. FIG. 6 illustrates a flowchart of this motor variable control process.

Likewise as in step S110, in step S200, the brake system ECU 100 computes a target W/C pressure (A) and a necessary amount of brake fluid corresponding to the target W/C pressure (A). The program then proceeds to step S210, wherein the brake system ECU 100 calculates a motor output corresponding to the necessary amount of brake fluid obtained in step S200. As a result, a value of electric current to be supplied to each motor 11 and 12 turns to equal to or less than a value of electric current supplied in the situations where a motor is driven to the full extent.

The program then proceeds to step S220, wherein the brake system ECU 100 judges whether a brake operation is being implemented. For example, when the brake system ECU 100 confirms, on the basis of the detection signal of the brake depressing force sensor 2, that the brake pedal 1 has been still depressed, the brake system ECU 100 determines that the brake operation is being performed. Once the depression against the brake pedal 1 is discontinued, the brake system ECU 100 determines that the brake operation was terminated. In step S220, when an affirmative answer "YES" is obtained, the motor variable control process is continued. On the other hand, when a negative answer "NO" is obtained, the program proceeds to step S230 so as to terminate the motor variable control process. In step S230, the timer 100d resets the elapsed time counted and the motor variable control process is terminated. Accordingly, the motor driving control process is terminated.

The above-described motor drive control process does not include a process for outputting electric current to each motor 11 and 12 in the above process. However, once a value of electric current to be supplied is set, another non-illustrated flowchart for driving control valves or for driving the motor is employed in a manner that electric current is supplied to each motor 11 and 12 at its electric current value.

As described above, according to the first embodiment of the present invention, until the period of time T2 is elapsed since the brake pedal 1 is depressed, each motor 11 and 12 is supplied with electric current at a value or amount to be driven to the full extent and braking force is generated at each wheel FR, RL, RR and FL.

More specifically, according to the first embodiment of the present invention, the control valves SCSS, SNO1, SNO2, SWC1, SWC2, SLFR, SLRL, SLFL and SLRR and the motors 11 and 12 are driven respectively so as to achieve the state illustrated in Table 1.

Then, the first and second normally open valves SNO1 and SNO2 are turned on and the first and second normally closed valves SWC1 and SWC2 are also turned on. As a result, the first and second normally open valves SNO1 and SNO2 each turn to disconnecting states (closed states), while the first and second normally closed valves SWC1 and SWC2 each turn to connecting states (open states).

Turning on or off of each linear valve SLFR, SLRL, SLFL and SLRR is duty controlled, or PWM (Pulse Width Modulation) controlled under which the amount of electric power supplied per unit of time to each linear valve is adjusted, so that pressure differential between the upstream and downstream sides of each linear valve is controlled linearly. The stroke control valve SCSS is turned on and the stroke simulator 4 turns to a connecting state (open state), i.e., communicates with the secondary chamber 3b via the conduits B and D. Therefore, even if the pistons 3c and 3d move in response to the depression on the brake pedal 1, brake fluid in the secondary chamber 3b flows into the stroke simulator 4. As a result, a user or driver can feel a reaction force corresponding to the depression force applied to the brake pedal 1. Further, the user or driver can depress the brake pedal 1 without feeling like depressing a solid plate, which feeling may be created due to the M/C pressure at an extremely high pressure level.

Even further, each motor 11 and 12 is supplied with electric current at a sufficient amount to be driven to the full extent, and each pump 7, 8, 9 and 10 suctions or discharges brake fluid. When each pump 7, 8, 9 and 10 operates in such a way, brake fluid is supplied to each W/C 6FR, 6RL, 6FL and 6RR.

In this stage, each first and second normally open valve SNO1 and SNO2 is in a disconnecting state, and brake fluid pressure at the downstream of each pump 7, 8, 9 and 10, i.e., W/C pressure in each W/C 6FR, 6RL, 6FL and 6RR is increased. In addition, because the first and second motors 11 and 12 are driven to the full extent, a discharge amount of brake fluid of each pump 7, 8, 9 and 10 is increased and the W/C pressure of each W/C 6FR, 6RL, 6FL and 6RR is increased quickly.

Further, each first and second normally closed valve SWC1 and SWC2 is in a connecting state, and electric current per unit of time supplied to each linear valve SLFR, SLRL, SLFL and SLRR is duty controlled. Therefore, W/C pressure of each W/C 6FR, 6RL, 6FL and 6RR is adjusted according to the duty ratio of the duty control.

The brake system ECU 100 monitors the W/C pressure generated at each W/C 6FR, 6RL, 6FL and 6RR of each wheel, on the basis of a detection signal of each pressure sensor 13, 14, 15 and 16. The brake system ECU 100 accordingly adjusts each W/C pressure to a desired value by adjusting an amount of electric current supplied to each motor 11 and 12 so as to control the rotation speed (e.g., rotational angular speed) thereof and by controlling the duty ratio for turning on or off of the electric current supply to each linear valve SLFR, SLRL, SLFL and SLRR.

As described above, As described above, braking force is generated so as to be a target braking force corresponding to brake a depressing force applied to the brake pedal 1.

Once the timer 100d counts the period of time T1 and the period of time T2 from the brake operation starting point, a value of electric current to be supplied to each motor 11 and 12 is set corresponding to the calculation results in step S210 in FIG. 6. Further, the pressure differential of each linear valve SLFR, SLRL, SLFL and SLRR is then controlled so that W/C pressure of each W/C 6FR, 6RL, 6FL and 6RR is modulated. Therefore, actual W/C pressure of each W/C 6FR, 6RL, 6FL and 6RR successively turns to the target W/C pressure corresponding to the depression amount of the brake pedal 1. Thus the target braking force is generated at each wheel.

(2) Abnormal-State Brake Operation

When an abnormal situation occurs in the vehicle brake control apparatus, there is a possibility that control signals cannot be outputted from the brake system ECU 100, or that some of the control valves SCSS, SNO1, SNO2, SWC1, SWC2, SLFR, SLRL, SLFL, SLRR or the first and second motors 11, 12 do not operate normally. In this case, electric power to the various control valves SCSS, SNO1, SNO2, SWC1, SWC2, SLFR, SLRL, SLFL, SLRR and the first and second motors 11, 12 are all turned off, as illustrated in Table 1.

In other words, since electric power supply to the first and second normally open valves SNO1 and SNO2 is shut down, both valves SNO1 and SNO2 turn to connecting states (open states). Because electric power supply to the first and second normally closed valves SWC1 and SWC2 is shut down, both valves SWC1 and SWC2 turn to disconnecting states (closed states).

Since the electric power supply to all of the first to fourth linear valves SLFR, SLRL, SLFL, and SLRR is shut down, the first to fourth linear valves SLFR, SLRL, SLFL, and SLRR are in connecting states (open states). Since electric power supply to the stroke control valve SCSS is also supply, the stroke simulator 4 and the secondary chamber 3b are cut off from each other.

Further, electric power supply to the first and second motors 11 and 12 are shut down, and pumps 7, 8, 9 and 10 stop suction and discharge of the brake fluid.

In such circumstances, the primary chamber 3a of the M/C 3 communicates with the W/C 6FR of the front-right wheel FR via the conduits A, E and G1. The secondary chamber 3b of the M/C 3 communicates with the W/C 6FL of the front-left wheel FL via the conduits B, F and G3.

Therefore, when the brake pedal 1 is depressed and the push rod or the like is pushed according to the depression force applied to the brake pedal 1, M/C pressure is generated in the primary chamber 3a and the secondary chamber 3b. The M/C pressure is transmitted to the W/Cs 6FR and 6FL of the front wheels FL and FR. Braking force is generated thereby at both front wheels FR and FL.

According to the first embodiment of the present invention, as described above, the check valves 20 and 21 are installed at the pumps 7 and 9, respectively. Therefore, during operation in such abnormal situation, although W/C pressure in the W/Cs 6FR and 6FL for the front wheels is generated in the conduits G1 and G3, the check valves 20 and 21 enable to prevent the W/C pressure from being applied to the pumps 7 and 9 and further enable to prevent brake fluid from leaking at the pumps 7 and 9. Therefore, it is possible to prevent W/C pressure from decreasing.

As described above, in the brake control apparatus for the vehicle according to the first embodiment, an amount of electric current supplied to the first and second motors 11 and 12 is changed to the amount of electric current corresponding to a target W/C pressure, not immediately after the discharge amount of brake fluid of each pump 7, 8, 9 and 10 reaches the threshold value of brake fluid amount, but the timing to change the amount of electric current to be supplied is delayed or extended, as illustrated in FIG. 4. An extended period of time T2 is determined on the basis of an amount of target W/C pressure in the period of time T1 from the brake operation starting point, i.e., when the discharge amount of brake fluid of each pump 7, 8, 9 and 10 reaches the threshold value of the brake fluid amount. As a result, it is possible to improve braking response at the initial brake operation to a greater extent.

As described above, according to the first embodiment of the present invention, while improving braking response at an initial brake operation, it is possible at the same time to reduce motor power consumption by changing an amount (electric current value) of electric current supplied to each motor 11 and 12 from an amount for driving the motor to the full extent to an amount corresponding to a target W/C pressure.

SECOND EMBODIMENT

Described below is a second embodiment of the present invention. The second embodiment is substantially the same as the first embodiment, apart from that a structure of a brake control apparatus for a vehicle is partially changed from the one of the first embodiment so that only the different portions will be described hereinbelow.

Figure 7:
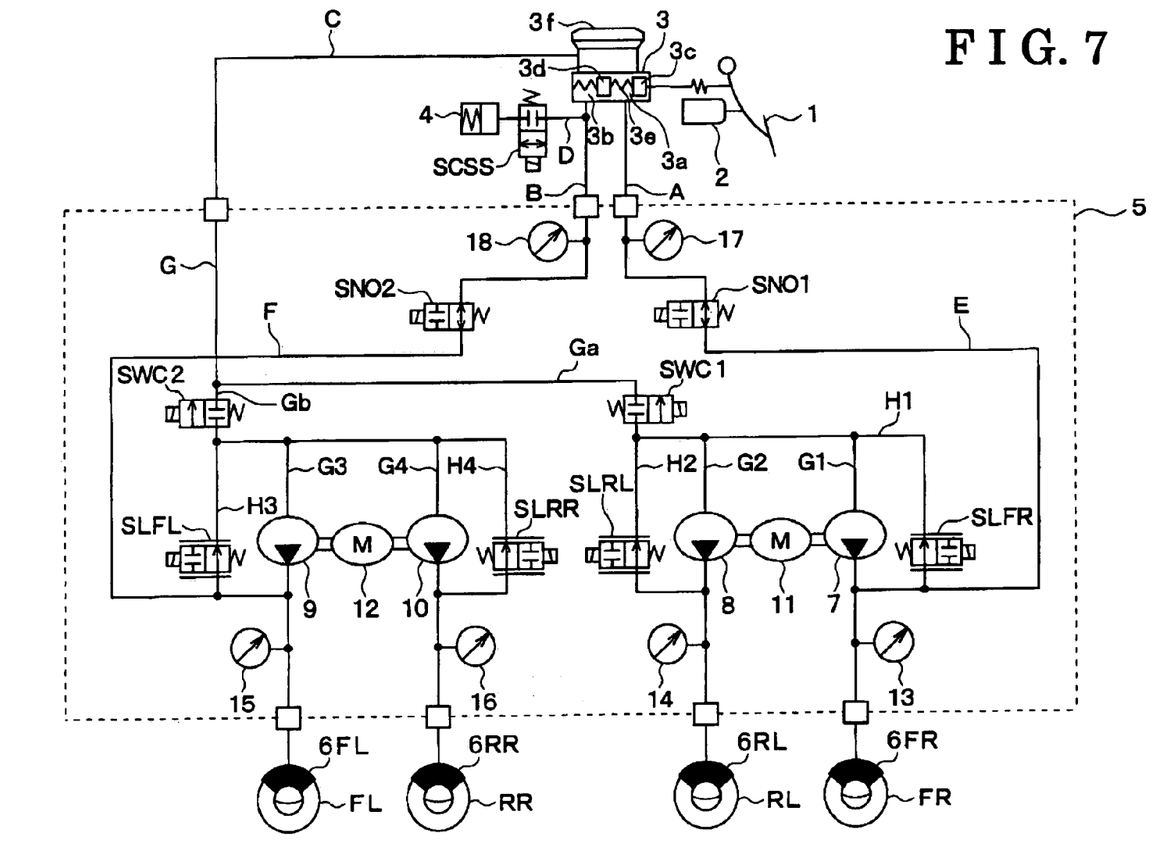
FIG. 7 is a view illustrating a configuration of a fluid pressure circuit of a brake control apparatus for a vehicle according to a second embodiment of the present invention.

FIG. 7 illustrates a configuration of a fluid pressure circuit of a brake control apparatus for a vehicle according to the second embodiment. As illustrated herein, the conduit G branches to a conduit Ga (first one) and a conduit Gb (second one). The first normally closed valve SWC1 is mounted at the conduit Ga, i.e., at a downstream side of a branching point of the conduit G and at an upstream side of the conduits H1 and H2. The second normally closed valve SWC2 is mounted at the conduit Gb, i.e., at a downstream side of the branching point of the conduit G and at an upstream side of the conduits H3 and H4.

Also according to the above structure, it is possible to obtain the same effects as the first embodiment by extending a period of time, in which the first and second motors 11 and 12 are activated to the full extent during the starting of the brake operation.

Further, for example should the first normally closed valve SWC1 turn to a disconnecting state in an abnormal situation, only the upstream side of the conduits H1 and H2 turns to be in a disconnecting state. In such circumstances, when M/C pressure is generated at the primary chamber 3a of the M/C 3 in response to depressing the brake pedal 1, fluid at the M/C pressure level is transmitted not only to the W/C 6FR for the front-right wheel FR but also to the W/C 6RL for the rear-left wheel RL. Likewise, for example should the second normally closed valve SWC2 turn to a disconnecting state in an abnormal situation, only the upstream side of the conduits H3 and H4 turns to be in a disconnecting state. In such circumstances, when M/C pressure is generated at the secondary chamber 3b of the M/C 3 in response to depressing against the brake pedal 1, fluid at the M/C pressure level is transmitted not only to the W/C 6FL for the front-left wheel FL but also to the W/C 6RR for the rear-right wheel RR.

As described above, according to the brake control apparatus for a vehicle according to the second embodiment, it is possible to generate W/C pressure at the W/Cs 6FR, 6RL, 6FL and 6RR for all the four wheels FR, RL, FL and RR even in an abnormal situation, which enables to generate braking force in a further balanced manner.

Further, according to the second embodiment, the check valves 20 and 21, which are included in the apparatus of the first embodiment, are not provided. However, even if brake fluid leakage occurs at each pump 7 and 9, the brake fluid flow due to such leakage is blocked by each first and second normally closed valve SWC1 and SWC2. Therefore, reduction in W/C pressure does not occur in the corresponding W/C.

THIRD EMBODIMENT

Described below is a third embodiment of the present invention. The third embodiment is substantially the same as the second embodiment, apart from that a structure of a brake control apparatus for a vehicle is partially changed from that of the second embodiment so that only the different portions will be described hereinbelow.

Figure 8:
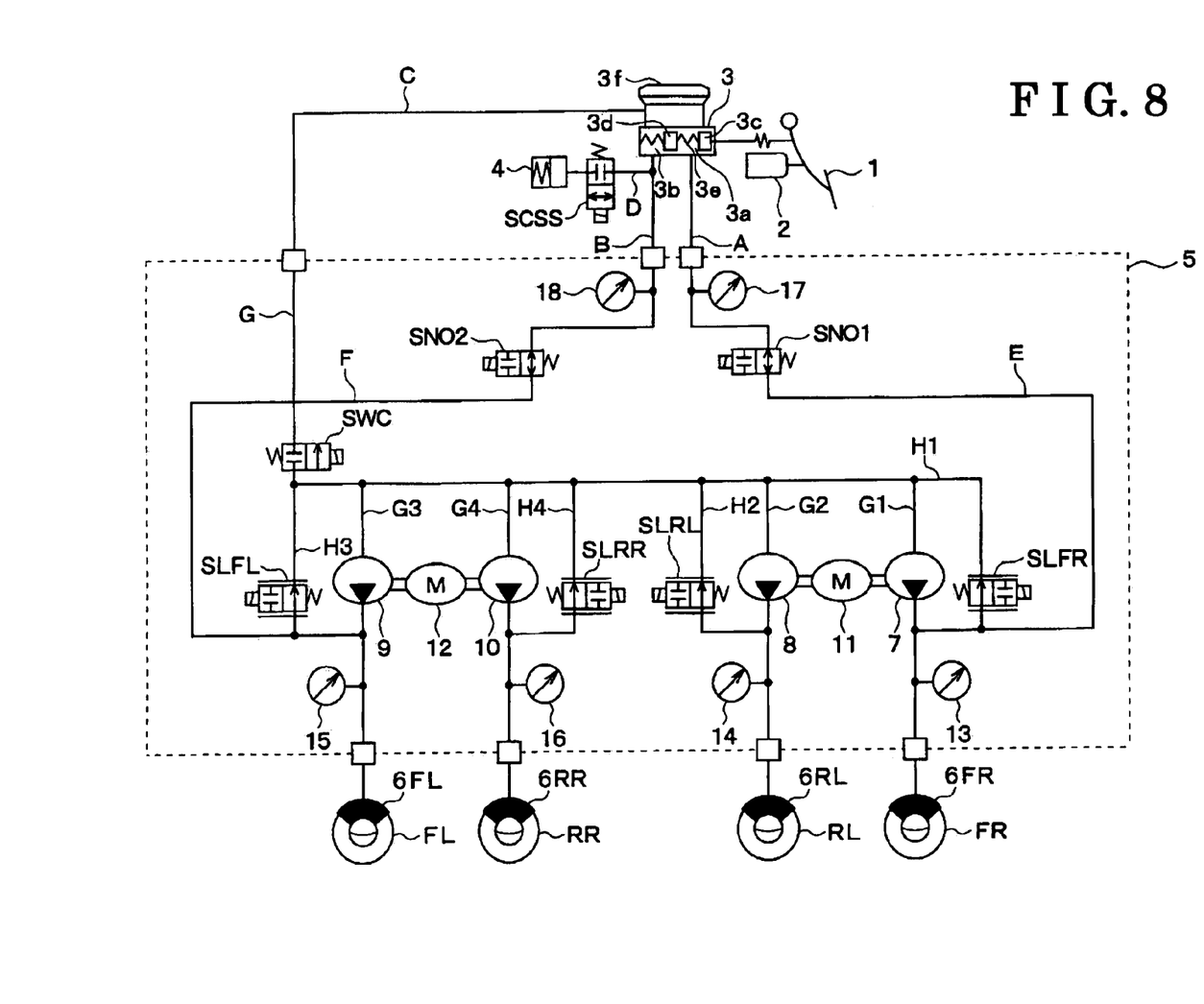
FIG. 8 is a view illustrating a configuration of a fluid pressure circuit of a brake control apparatus for a vehicle according to a third embodiment of the present invention.

FIG. 8 illustrates a configuration of a fluid pressure circuit of a brake control apparatus for a vehicle according to the third embodiment. As illustrated herein, the brake control apparatus of the third embodiment is provided with a single normally closed valve SWC, which is different from the apparatuses of the first and second embodiments which each are provided with the first and second normally closed valves SWC1 and SWC2. The single normally closed valve SWC is shared by the two conduit systems.

Also according to the above structure, it is possible to obtain the same effects as the first embodiment by extending a period of time, in which the first and second motors 11 and 12 are activated to the full extent during the starting of the brake operation.

Further, also according to the above structure, for the case of a normal brake operation, W/C pressures in the W/C 6FR, 6RL, 6FL and 6RR for all the four wheels FR, RL, FL and RR can be modulated as needed. Further, for the case of an abnormal situation, the W/C 6FR, 6RL, 6FL and 6RR for all the four wheels FR, RL, FL and RR can be supplied with fluid at a level of M/C pressure generated in the M/C 3 in response to depressing on the brake pedal 1.

Further, as described above, for the case of an abnormal situation, all the four wheels FR, RL, FL and RR of the two conduit systems are applied with M/C pressure. Therefore, it is possible to achieve a space-saving conduit system.

The switchable operating state of the normally closed valve SWC is the same as the one of the first and second normally closed valves SWC1 and SWC2 illustrated in Table 1.

OTHER EMBODIMENTS

The brake control apparatus for a vehicle illustrated in FIG. 1 is disclosed as an example of a brake structure to which the present invention is applicable. The brake structure is not limited to the one in FIG. 1 and can be modified in various manners.

According to the first embodiment, the brake control apparatus has a cross (X) dual conduit system, one conduit system for the front-right wheel and the rear-left wheel and the other conduit system for the front-left wheel and the rear-right wheel. However, another conduit system, such as a front-rear conduit system, can be applicable.

According to the above-described embodiments, only the conduit C is connected to the master reservoir 3f, and brake fluid is supplied through this conduit C to the first and second conduit systems. However, another conduit can be connected to the master reservoir 3f in addition to the conduit C. In this case, the conduit C can supply brake fluid to the first conduit system, and the additional conduit can supply brake fluid to the second conduit system.

Further, according to the above-described embodiments, for the case of an abnormal situation, in which the pumps 7, 8, 9 and 10 do not function to pressurize brake fluid, the M/C 3 are connected to the first and second conduit systems. Meanwhile, for the case of a normal brake operation, brake fluid is supplied from the master reservoir 3f. However, this brake fluid supply is one of the examples. That is, the M/C 3 does not necessarily have to be connected to the first and second conduit systems. Further, the apparatus does not have to be provided with the M/C 3. Still further, brake fluid does not have to be supplied by the master reservoir 3f and can be supplied from another reservoir which can store brake fluid.

Figure 9:
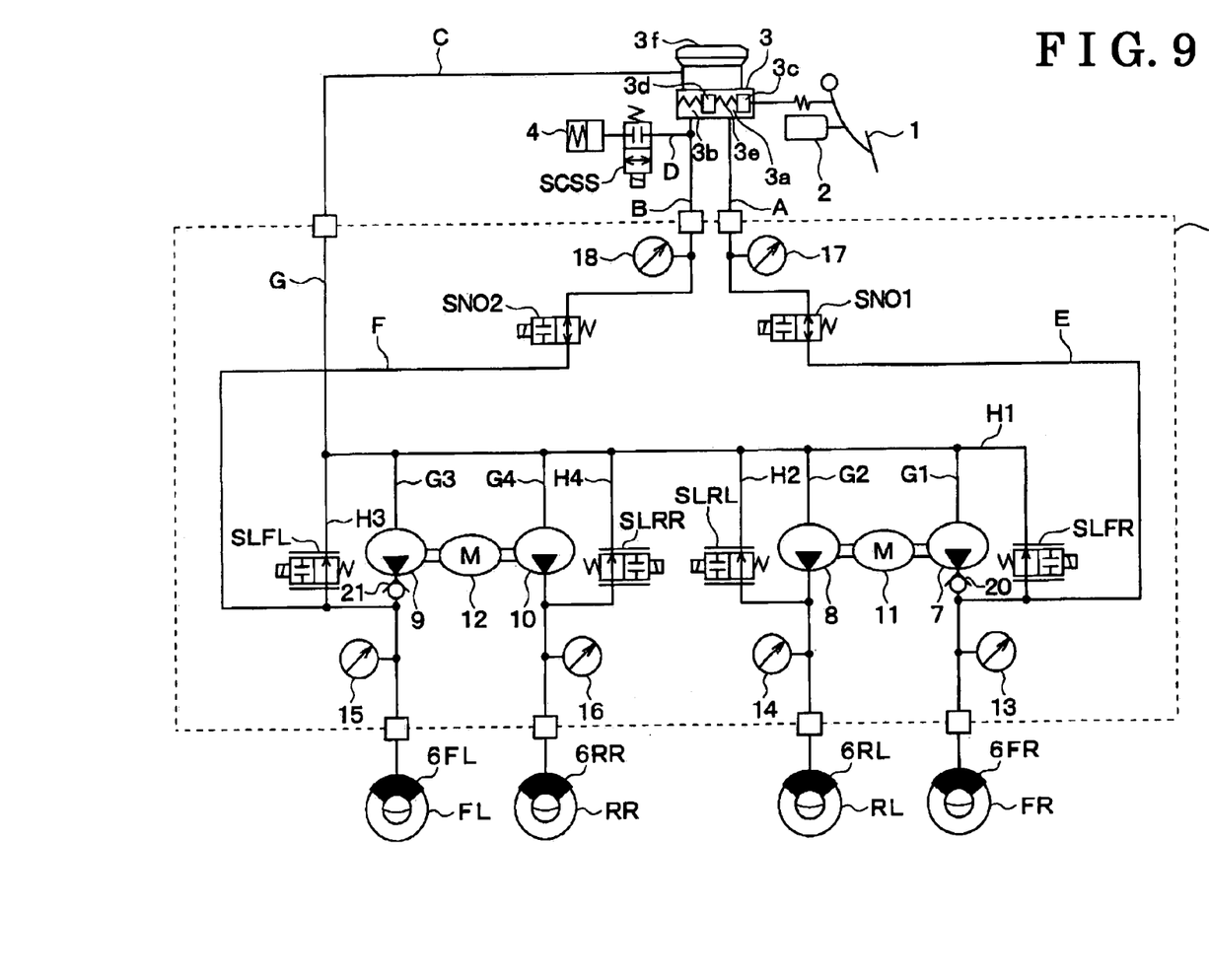
FIG. 9 is a view illustrating a configuration of a fluid pressure circuit of a brake control apparatus for a vehicle according to another embodiment of the present invention.

Still further, according to the above-described embodiments, in consideration of a fail safe mode, M/C pressure, which is generated on the basis of depression against the brake pedal 1, can be applied to the W/Cs 6FR, 6RL, 6FL and 6RR even when the linear valves SLFR, SLRL, SLFL and SLRR do not operate properly. However, when an error occurs at a portion different from the linear valves SLFR, SLRL, SLFL and SLRR, these linear valves can be operated. In such circumstances, once the linear valves are electrically excited and the conduits H1, H2, H3 and H4 each turn to be in a disconnecting state (or, in a state where pressure differential between an upstream side and a downstream side of each valve turns to be a value at the maximum), M/C pressure can be applied to the 6FR, 6RL, 6FL and 6RR. Therefore, there is no need to always provide the first and second normally closed valves SWC1, SWC2 and the normally closed valve SWC. That is, as illustrated in FIG. 9, the fluid pressure circuit can have the structure without the first and second normally closed valves SWC1, SWC2 and the normally closed valve SWC.

However, in order to enable to achieve a fail-safe mode all mechanically, the first and second normally closed valves SWC1, SWC2 and the normally closed valve SWC are important.

Figure 10:
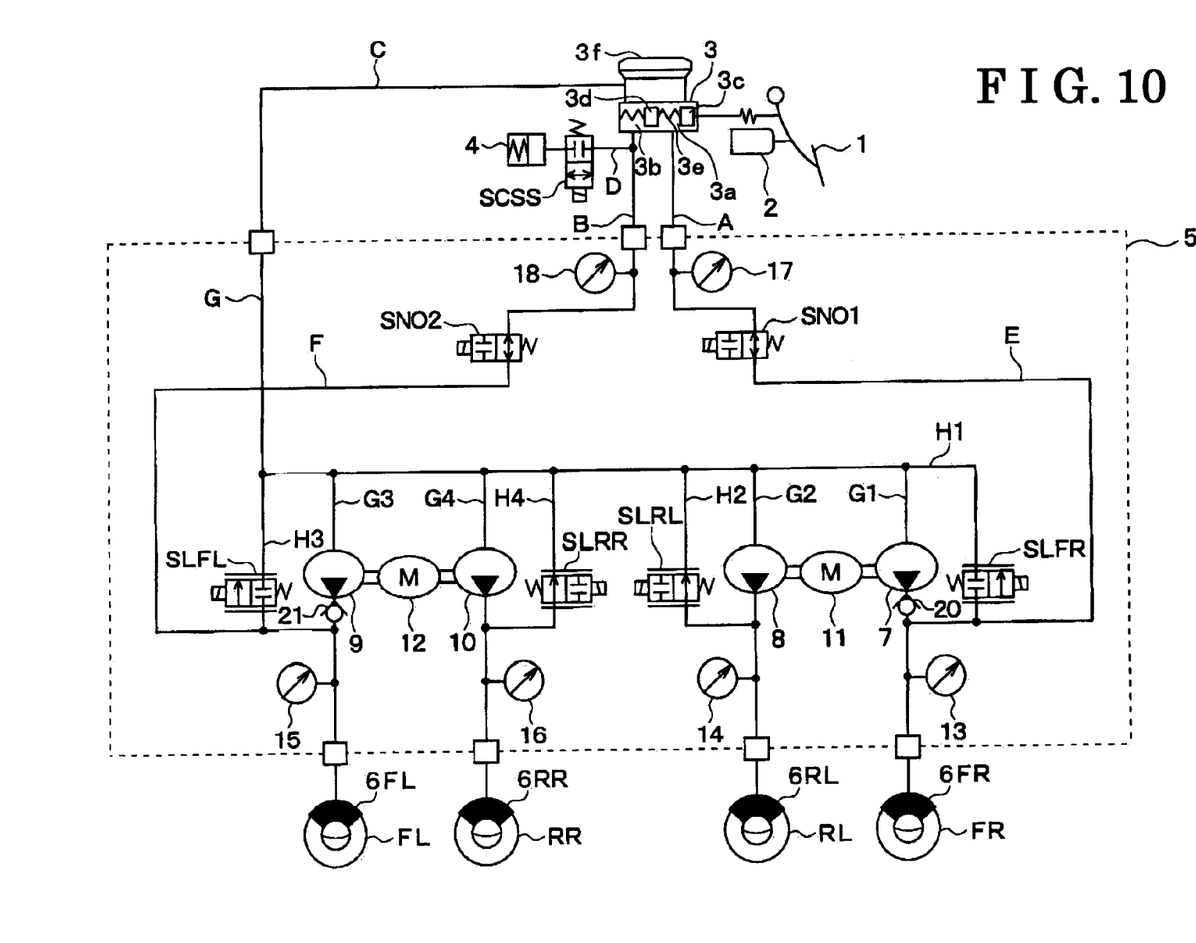
FIG. 10 is a view illustrating a configuration of a fluid pressure circuit of a brake control apparatus for a vehicle according to still another embodiment of the present invention.

Therefore, as illustrated in FIG. 10, when normally closed linear valves are employed as the first linear valve SLFR and the third linear valve SLFL respectively, it is possible to achieve a fail-safe mode mechanically, which is a more preferable structure. It is possible that normally closed linear valves are employed also for the second and fourth linear valves SLRL and SLRR respectively.

According to the above embodiments, the brake pedal 1 is employed as an example of the brake operating member. However, the brake operating member can be a brake lever and so on. Further, the timer is employed as an example of the timing means. However, the timing means can be a counter and so on, which counts a time on the basis of a clock signal.

As described above, an amount of electric current supplied to each first and second motor is changed to the amount of electric current corresponding to a target W/C pressure, not immediately after the discharge amount of brake fluid of each pump reaches the threshold value of brake fluid amount, but the timing to change the amount of electric current to be supplied is delayed or extended. The extended period of time is determined on the basis of an amount of target W/C pressure in the period of time T1 where the discharge amount of brake fluid of each pump 7, 8, 9 and 10 reaches the threshold value of the brake fluid amount. As a result, it is possible to improve braking response at the initial brake operation to a greater extent. It is hence possible to reduce motor power consumption while improving a braking response at the initial brake operation.

For example, the extended period of time calculating means extends the extended period of time in response to an increase in the target wheel cylinder pressure.

The extended period of time calculating means calculates the extended period of time not only based upon the target wheel cylinder pressure itself but also based upon an operation amount detected by the operating amount sensor used as a parameter of the target wheel cylinder pressure.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A brake control apparatus for a vehicle, comprising:
   a brake operating member operated by an operator of the vehicle;
   an operation amount sensor for detecting an operation amount of the brake operating member;
   first and second front wheel cylinders mounted at first and second front wheels of the vehicle respectively;
   first and second rear wheel cylinders mounted at first and second rear wheels of the vehicle respectively;
   a reservoir for storing brake fluid;
   a main conduit connecting the first and second front wheel cylinders and the first and second rear wheel cylinders with the reservoir, the main conduit branching into four conduits respectively connected with the first and second front wheel cylinders and the first and second rear wheel cylinders;
   a first pump located in the first one of the four conduits for supplying pressurized brake fluid to the first front wheel cylinder by suctioning and discharging the brake fluid stored in the reservoir;
   a second pump located in the second one of the four conduits for supplying pressurized brake fluid to the first rear wheel cylinder by suctioning and discharging the brake fluid stored in the reservoir;
   a third pump located in the third one of the four conduits for supplying pressurized brake fluid to the second front wheel cylinder by suctioning and discharging the brake fluid stored in the reservoir;
   a fourth pump located in the fourth one of the four conduits for supplying pressurized brake fluid to the second rear wheel cylinder by suctioning and discharging the brake fluid stored in the reservoir;
   a first conduit system arranged in the main conduit and including the first pump and the second pump for supplying the pressurized brake fluid to the first front wheel cylinder and the first rear wheel cylinder, respectively;
   a second conduit system arranged in the main conduit and including the third pump and the fourth pump for supplying the pressurized brake fluid to the second front wheel cylinder and the second rear wheel cylinder, respectively;
   a first motor provided at the first conduit system for driving the first and the second pumps;
   a second motor provided at the second conduit system for driving the third and the fourth pumps;
   first, second, third and fourth pressure modulating circuits arranged in parallel with the first, second, third and fourth pumps for returning the brake fluid in the wheel cylinders to the reservoir;
   first, second, third and fourth linear valves provided at the corresponding first, second, third and fourth pressure modulating circuits, respectively;
   controlling means driving the first, second, third and fourth linear valves and the first and the second motors based on a detection signal from the operating amount sensor, determining a brake operation starting time to a time when the brake operating member is detected to be operated based upon the operating amount sensor, controlling a value of electric current to be supplied to each first and second motor to the maximum value since the brake operation starting time, and changing the value of electric current to a value corresponding to a target wheel cylinder pressure of each wheel cylinder corresponding to an operation amount detected by the operation amount detecting sensor from the maximum value, and the controlling means including:
   timing means for timing an elapsed time from the brake operation starting time; and
   extended period of time calculating means obtaining an extended period of time based upon the target wheel cylinder pressure corresponding to an operation amount detected by the operation amount detecting sensor when the timing means times a predetermined period of time at which an amount of brake fluid discharged by each pump reaches a threshold value of brake fluid amount to generate an actual wheel cylinder pressure, the extended period of time during which the value of electric current to be supplied to each first and second motor is maintained at the maximum value.

2. A brake control apparatus for a vehicle according to claim 1, wherein the extended period of time is extended in response to an increase in the target wheel cylinder pressure.

3. A brake control apparatus for a vehicle according to claim 1, wherein the extended period of time is calculated based on the operation amount detected by the operating amount sensor used as a parameter of the target wheel cylinder pressure.

4. A brake control apparatus for a vehicle according to claim 2, wherein the extended period of time is calculated based on the operation amount detected by the operating amount sensor used as a parameter of the target wheel cylinder pressure.

5. A brake control apparatus for a vehicle according to claim 1, wherein the threshold value of brake fluid amount to generate an actual wheel cylinder pressure is the least value of brake fluid amount exceeding an ineffective fluid amount.

6. A brake control apparatus for a vehicle according to claim 1, wherein the first conduit system includes the first and the second ones of the four conduits, the first modulating circuit and the second modulating circuit and the second conduit system includes the third and the fourth ones of the four conduits, the third modulating circuit and the fourth modulating circuit.

7. A brake control apparatus for a vehicle, comprising:
   a brake operating member operated by an operator of the vehicle;
   an operation amount sensor for detecting an operation amount of the brake operating member;

first and second front wheel cylinders mounted at first and second front wheels of the vehicle respectively;

first and second rear wheel cylinders mounted at first and second rear wheels of the vehicle respectively;

a reservoir for storing brake fluid;

a main conduit connecting the first and second front wheel cylinders and the first and second rear wheel cylinders with the reservoir, the main conduit branching into four conduits respectively connected with the first and second front wheel cylinders and the first and second rear wheel cylinders;

a first pump, located in the first one of the four conduits, for pressurizing a first one of the first front wheel cylinder, the second front wheel cylinder, the first rear wheel cylinder, and the second rear wheel cylinder by suctioning and discharging the brake fluid stored in the reservoir;

a second pump, located in the second one of the four conduits, for pressurizing a second one of the first front wheel cylinder, the second front wheel cylinder, the first rear wheel cylinder, and the second rear wheel cylinder by suctioning and discharging the brake fluid stored in the reservoir;

a third pump, located in the third one of the four conduits, for pressurizing a third one of the first front wheel cylinder, the second front wheel cylinder, the first rear wheel cylinder, and the second rear wheel cylinder by suctioning and discharging the brake fluid stored in the reservoir;

a fourth pump, located in the fourth one of the four conduits, for pressurizing a fourth one of the first front wheel cylinder, the second front wheel cylinder, the first rear wheel cylinder, and the second rear wheel cylinder by suctioning and discharging the brake fluid stored in the reservoir;

a first conduit system arranged in the main conduit and including the first pump and the second pump for supplying the pressurized brake fluid to the first one of the first front wheel cylinder, the second front wheel cylinder, the first rear wheel cylinder, and the second rear wheel cylinder and the second one of the first front wheel cylinder, the second front wheel cylinder, the first rear wheel cylinder, and the second rear wheel cylinder;

a second conduit system arranged in the main conduit and including the third pump and the fourth pump for supplying the pressurized brake fluid to the third one of the first front wheel cylinder, the second front wheel cylinder, the first rear wheel cylinder, and the second rear wheel cylinder and the fourth one of the first front wheel cylinder, the second front wheel cylinder, the first rear wheel cylinder, and the second rear wheel cylinder;

a first motor provided at the first conduit system for driving the first and the second pumps;

a second motor provided at the second conduit system for driving the third and the fourth pumps;

first, second, third and fourth pressure modulating circuits arranged in parallel with the first, second, third and fourth pumps for returning the brake fluid in the wheel cylinders to the reservoir;

first, second, third and fourth linear valves provided at the corresponding first, second, third and fourth pressure modulating circuits, respectively;

controlling means driving the first, second, third and fourth linear valves and the first and the second motors based on a detection signal from the operating amount sensor, determining a brake operation starting time to a time when the brake operating member is detected to be operated based upon the operating amount sensor, controlling a value of electric current to be supplied to each first and second motor to the maximum value since the brake operation starting time, and changing the value of electric current to a value corresponding to a target wheel cylinder pressure of each wheel cylinder corresponding to an operation amount detected by the operation amount detecting sensor from the maximum value, and the controlling means including:

timing means for timing an elapsed time from the brake operation starting time; and extended period of time calculating means obtaining an extended period of time based upon the target wheel cylinder pressure corresponding to an operation amount detected by the operation amount detecting sensor when the timing means times a predetermined period of time at which an amount of brake fluid discharged by each pump reaches a threshold value of brake fluid amount to generate an actual wheel cylinder pressure, the extended period of time during which the value of electric current to be supplied to each first and second motor is maintained at the maximum value.

* * * * *